A. ELLIOTT.
Vehicle-Spring Brace.

No. 203,330.  Patented May 7, 1878.

Witnesses:
Edw. W. Donn
L. M. Dungan

Inventor:
Austin Elliott
By Parker H. Sweet Jr. & Co.
Attys.

UNITED STATES PATENT OFFICE.

AUSTIN ELLIOTT, OF WARRENSBURG, MISSOURI.

IMPROVEMENT IN VEHICLE-SPRING BRACES.

Specification forming part of Letters Patent No. 203,330, dated May 7, 1878; application filed April 15, 1878.

*To all whom it may concern:*

Be it known that I, AUSTIN ELLIOTT, of Warrensburg, in the county of Johnson and State of Missouri, have invented certain new and useful Improvements in Braces for Supporting Carriage-Springs, &c.; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
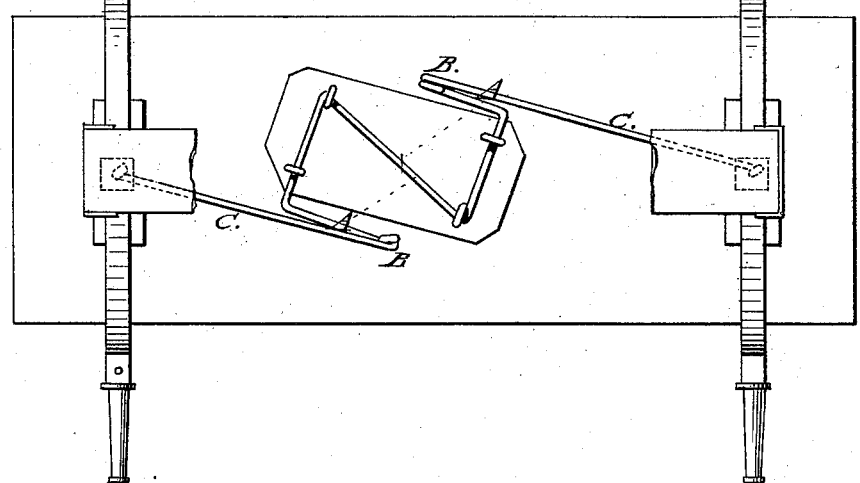
Figure 2:
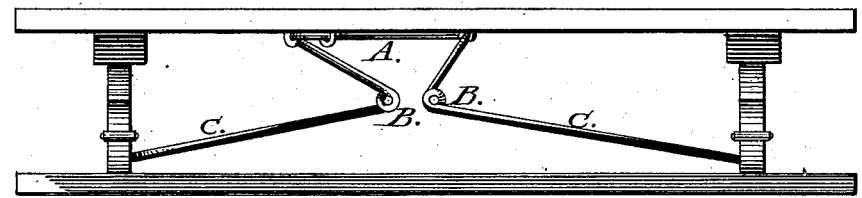
Figure 3:
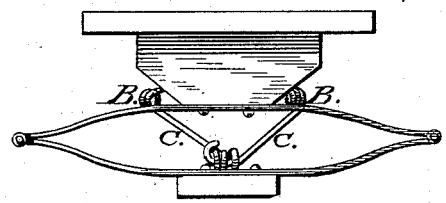

Figure 1 is a bottom view of a vehicle embodying my improvement, and Fig. 2 is a side elevation of the same.

Similar letters of reference indicate corresponding parts in both figures.

My invention has for its object to provide an efficient means for preventing the breaking or bending of the elliptical springs of vehicles by the forward and back movement of the body of said vehicle when passing over rough roads or wooden bridges, as also to prevent vehicle-bodies from being strained or broken by said movements; and the invention consists of a Z-shaped brace, having projecting ends, attached to the under side of the body of the vehicle, and the ends extending back and front and attached to the bottom of the vehicle-springs, all as will be hereinafter more fully described, and pointed out in the claims.

Referring to the drawings, A represents the Z-shaped brace, constructed of the best round spring-steel, or other suitable material, and having a curve or twist, B, at each end, terminating in projecting arms or rods C, said brace being attached by suitable bolts to the center of the bottom of the vehicle-body beneath, while the rods C, one on each side, extend in opposite directions back and front, where they are secured to the bottom of the vehicle-springs, as shown in the drawings.

The construction of my invention being as described, it will be observed that in the operation of the same the vehicle-body will have its natural up-and-down movement; but at the same time the brace prevents the forward and back movement consequent upon traveling over rough roads, log bridges, or up and down declivities in the road, as also obviating the throwing of the load obliquely on one spring.

By means of my present invention, the vehicle bodies and springs are greatly strengthened, and then are rendered capable of undergoing double use and wear before any repairs are rendered necessary, and at the same time the brace causes no noise or friction whatever while in operation, which is not the case with those now in use.

Having thus described my invention, what I claim as new and useful is—

A supporting-brace for vehicle bodies and springs, consisting of the Z-shaped brace A, rigidly secured to the under central part of the vehicle-body, and having bent or twisted ends B, terminating in projecting arms C, which are secured at their outer ends to the upper central part of the front and rear axles of the vehicle, substantially as and for the purpose specified.

In testimony that I claim the foregoing as my own invention I affix my signature in presence of two witnesses.

AUSTIN ELLIOTT.

Witnesses:
 JAMES K. WARD,
 GEO. D. WEIDEMEYER.